(12) United States Patent
Bischoff et al.

(10) Patent No.: US 12,529,601 B2
(45) Date of Patent: Jan. 20, 2026

(54) SYSTEM AND METHOD FOR COLOR MATCHING

(71) Applicant: BASF Coatings GmbH, Müenster (DE)

(72) Inventors: Guido Bischoff, Muenster (DE); Lena Boehling, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 460 days.

(21) Appl. No.: 18/255,491

(22) PCT Filed: Dec. 7, 2021

(86) PCT No.: PCT/EP2021/084677
§ 371 (c)(1),
(2) Date: Jun. 1, 2023

(87) PCT Pub. No.: WO2022/122777
PCT Pub. Date: Jun. 16, 2022

(65) Prior Publication Data
US 2024/0027271 A1 Jan. 25, 2024

(30) Foreign Application Priority Data
Dec. 12, 2020 (EP) .................... 20213636

(51) Int. Cl.
*G01J 3/46* (2006.01)
*G01N 33/32* (2006.01)

(52) U.S. Cl.
CPC .............. *G01J 3/463* (2013.01); *G01N 33/32* (2013.01); *G01J 2003/467* (2013.01)

(58) Field of Classification Search
CPC .... G01J 3/46; G01J 3/463; G01J 3/504; G01J 2003/467; G01N 33/32
See application file for complete search history.

(56) References Cited

U.S. PATENT DOCUMENTS

| 4,813,000 | A | * | 3/1989 | Wyman | ..................... G01J 3/46 356/402 |
| 4,887,217 | A | | 12/1989 | Sherman | |
| 7,804,597 | B2 | * | 9/2010 | De Haas | ................. G01J 3/463 356/402 |
| 2002/0149770 | A1 | * | 10/2002 | Kubo | ..................... G01J 3/504 356/402 |

(Continued)

FOREIGN PATENT DOCUMENTS

| CN | 110046635 A | * | 7/2019 | .............. G01J 3/463 |
| EP | 2149038 B1 | | 7/2018 | |

(Continued)

OTHER PUBLICATIONS

International Search Report and Written Opinion for corresponding PCT/EP2021/084675, mailed Apr. 7, 2022, 12 pages.

(Continued)

*Primary Examiner* — Abdullahi Nur
(74) *Attorney, Agent, or Firm* — Armstrong Teasdale LLP

(57) ABSTRACT

Disclosed herein is a computer-implemented color matching method using a paint adjustment algorithm running on a processor and a database which includes specific optical data of individual color components. Further disclosed herein is a respective system.

11 Claims, 5 Drawing Sheets

(56) References Cited

U.S. PATENT DOCUMENTS

2004/0122648 A1* 6/2004 Ando .................... G06Q 10/06
703/22
2016/0313294 A1 10/2016 Dattilo et al.
2024/0094057 A1* 3/2024 Bischoff ................ G01J 3/463

FOREIGN PATENT DOCUMENTS

| JP | 2005091347 A | * | 4/2005 | | |
|---|---|---|---|---|---|
| JP | 2006213854 A | * | 8/2006 | | |
| JP | 2023552639 A | * | 12/2023 | ............. | G01J 3/463 |
| KR | 20050084896 A | * | 8/2005 | ............. | G01J 3/463 |
| KR | 20050120815 A | * | 12/2005 | ............. | G01J 3/465 |
| WO | 2008150378 A1 | | 12/2008 | | |
| WO | 2013/092679 A1 | | 6/2013 | | |
| WO | 2016/172316 A1 | | 10/2016 | | |

OTHER PUBLICATIONS

Anonymous: "Multivariate Linear Regression : Machine Learning Medium", Aug. 23, 2017 (Aug. 23, 2017), pp. 1-6, XP055806540, Retrieved from the Internet: URL:https://machinelearningmedium. com/2017 /08/23/multivariate-linear-regression/ [retrieved on May 21, 2021] the whole document.

* cited by examiner

SYSTEM AND METHOD FOR COLOR MATCHING

CROSS-REFERENCE TO RELATED APPLICATIONS

This application is a U.S. National Phase Application of International Patent Application No. PCT/EP2021/084677, filed Dec. 7, 2021, which claims priority to European Patent Application No. 20213636.2, filed Dec. 12, 2020, each of which is hereby incorporated by reference herein.

FIELD OF THE INVENTION

The present invention refers to a computer-implemented color matching method and an appropriate system for a color in a liquid state to match a dry state color standard.

BACKGROUND

Most computer-aided color matching methods are based on physical models which describe an interaction of light with scattering or absorbing media, e.g. with colorants in paint layers. Each paint layer has specific light reflectance properties due to colorants contained. Each of these colorants has specific optical properties which are expressed by respective specific optical constants/specific optical data. Physical models can predict the light reflectance properties (color) of a paint layer/paint coating based on an information about the included colorants (respectively based on information about a respective formulation) together with the corresponding specific optical properties (respectively with the corresponding specific optical constants).

The specific optical constants of colorants describe e.g. the absorption and scattering properties (or the effect flake orientation) of colorants in the context of the respective physical model, like e.g. the K/S values in the well-known "Kubelka/Munk"-model. However, the reflectance properties of paint do not only depend on the formulation. It also strongly depends on the paint application process, generally how the paint was applied to its substrate. In the context of this invention the paint in wet state, respectively liquid paint, represents one specific paint application process. In this document the terms "paint application process" or "application" and "state" are used synonymously.

The specific optical properties of colorants are determined based on sample data with known formulation and known reflectance data which all were applied on a substrate by a common reference paint application process, respectively which all were measured in a common reference paint state (liquid or dry). Color predictions of a physical model as well as color matching processes are always related with this reference paint application process.

Color predictions of a physical model for a different target paint application process are subject to significant systematical errors and less accurate. Especially matches from scratch for different target paint application processes can be significantly inaccurate.

An appropriate formulation for a given target color can be predicted based on the physical model with existing optical constants of available colorants and with reflectance data of the target color as input, using numerical optimization algorithms.

The resulting formulation is supposed to match the target color as good as possible if the target paint application process is equal to the reference paint application process.

Color formulations can also be computed based on an existing sample with a known formulation, e.g. on a tinting step, which is close to the target color. In this case we talk about a color adjustment process. The existing sample should be applied and measured in the reference paint application process because the color adjustment algorithm is based on one fundamental assumption: "The model bias is (almost) constant for formulations which are close to the sample formulation". As long as the paint application process of the sample is equal to the reference paint application process and the adjusted formulation of a color adjustment is similar to the sample formulation the model bias is expected to be "similar": The adjustment algorithm interprets the sample offset, respectively the offset between the measured and the predicted reflectance data of the sample, as model bias. This model bias will automatically be considered/compensated within the adjustment algorithm and leads to a modification of the adjusted formulation (example: patent EP2149038B1). If the paint application process of the sample would be different in comparison to the reference paint application process, the model bias of the sample could not be related to the adjusted formulation. In this case the sample would include an additional non-constant bias caused by different paint application processes. This application process bias will propagate into the adjusted formulation. Depending on the scale of the application process bias of the sample the color adjustment results can be significantly inaccurate. Especially if reflectance data of a liquid-state paint application process is mixed with data of a dry-state paint application process, the application process bias is extremely high.

Today the tolerances for a target color are defined for dry paint. However, in most cases the paint is a liquid product. The optical properties of paint in the dry state are not equal to the liquid state. The color of paint strongly depends on the state of the paint: Reasons for significant color differences between wet paint and a dry paint layer are e.g.:
- Differences between instruments/measure devices for liquid state paint measurement and dry paint measurement
- Influences of the measuring cell for fluid paint (e.g. a glass cuvette or pane) in comparison to a clear coat on top of dry paint
- Differences of the refractive indices between wet paint ($n\approx 1.35$) and dry paint ($n\approx 1.5$), leading to different optical properties of the pigments embedded in paint
- Different orientations of effect flakes in paint
- "Milky" mixing clears in wet paint which are transparent/invisible in the dry paint layer.

Color matching is an iterative process. In practice a physical model with optical constants for a reference paint application process (the dry paint state) is used for the matching process. The matching process starts with a match from scratch or a search in a formulation database for a given target color in the dry state.

The term "match from scratch" comprises a color matching method which manages without information about an existing sample coating as a first solution. This method is applied e.g. if no formulation database is available or if no adequate first solution is found in a formulation database. In practice the "match from scratch" method often starts with a pre-selection step of components which are expected to be in the target color. This pre-selection step is not mandatory. The "match from scratch" method/algorithm computes as a first solution one or more preliminary matching formulas for the target color. This/these preliminary matching formula(s) can be sprayed and/or adjusted in a following step.

In comparison to a "color adjustment method", where a sample coating as first solution is available which is used to improve the color prediction accuracy of the physical model (e.g. based on an approximation of the model error by an analysis of the "sample offset"), the accuracy of a "match from scratch" method is typically lower.

The result is a first solution, i.e. a first paint formulation, which gets prepared/mixed in the color lab as wet paint. The wet paint is applied/sprayed with the reference paint application process onto a substrate and dried. Optionally an additional clear coat gets applied on top of the first paint layer/coating. At the end the reflectance of the dry paint layer/coating gets measured. Typically, the color of the first solution, i.e. the first formulation is not close enough to the target color. In this case an adjustment process of the first solution starts where the sample offset between the predicted and the measured reflectance for the first solution is considered. The sample offset is supposed to be a systematic and constant offset. If the sample offset would not be constant over the adjustment steps, e.g. in case of variations within the paint application process, then the color adjustment result would be significantly inaccurate. The adjusted formulation is a function of the target color and the sample offset. A non-constant sample offset will propagate into the adjusted formulation as application process bias.

The term "a non-constant sample offset" comprises that the offset of the adjusted formulation (after paint application) is significantly different compared to the offset of the sample.

The spraying and drying process ("paint application process") is a time-consuming and expensive process. An efficient alternative would be a color matching and adjustment process based on color measurements of all samples/tinting steps in the liquid state (instead of dry state) and optical constants for liquid paint (instead of dry paint). This approach would save the spraying and drying processes within the color matching and adjustment process. Furthermore, the reflectance data for the samples would not be affected with biases caused by variations of a dry paint application process. But in practice the target color is always given in the dry state. Comparing sample colors in liquid state with a color standard in a dry state would lead to significant biases and is not allowed.

Therefore, it is an object of the present invention to provide for a possibility to compensate for an application process bias in color adjustment methods when using both, colors in liquid state and colors in dry state.

SUMMARY OF THE INVENTION

The above-mentioned object is solved by the method and the system with the features of the respective independent claims. Further embodiments are presented by the following description and the respective dependent claims.

The present disclosure refers to a computer-implemented color matching method using a paint adjustment algorithm running on at least one computer processor, and a database which comprises specific optical data of individual color components, the specific optical data of the individual color components being determined on the basis of known reference paint coatings with known reference color formulations and known measured reference colors, the reference paint coatings being applied onto a substrate using a reference paint application process, respectively, wherein the paint adjustment algorithm is extended by an application adaption module which interworks with a color predicting model of the paint adjustment algorithm, and which is configured to receive application adaption parameters for a specific paint application process as input parameters, and to transform, using the received application adaption parameters, a color predicted by the color predicting model for use with the reference paint application process, into a transformed color valid for use with the specific paint application process.

That means that the application adaption module is configured to transform a color predicted by the color predicting model and appearing when using the reference paint application process, into a transformed color appearing when using the specific paint application process. The color predicted for use with the reference paint application process is transformed into a color valid for use with the specific paint application process that differs from the reference paint application process.

The terms "specific optical data of individual color components", "specific optical data of the individual color components" or "specific optical data of the colorants" are used synonymously herein and comprise specific optical properties and specific optical constants of the respective individual color components, i.e. colorants. The individual color components used in the color formulations of respective paint coatings are selected from the group comprising at least: color pigments, i.e. so-called solid pigments, effect pigments, binders, solvents and additives, such as matting pastes.

The terms "color", "color data", "reflectance", "reflectance data" and "reflectance properties" are used synonymously herein. The terms "paint application process", "application process", "application" and "state" are used in a synonymous manner. That means that a paint in wet state, respectively in liquid state represents, respectively defines, a specific paint application process, and that a paint in dry state represents another specific paint application process.

The terms "paint formulation", "color formulation" and "formulation" are used synonymously herein. The terms "paint adjustment algorithm"; "color adjustment algorithm" and "adjustment algorithm" are used synonymously herein. The terms "paint application process" and "application process" are used synonymously herein. The terms "computer processor" and "processor" are used synonymously herein.

Known approaches for color formulation calculation on the basis of a radiative transfer model can be found in the literature, reference is made, for example, to "Farbenphysik für industrielle Anwendungen" of Georg A. Klein.

A basic idea of the color formulation calculation is a characterization of the specific optical data, i.e. the optical properties and/or the optical constants of all relevant individual color components, e.g. of all color pastes/colorants, on the basis of previous calibration coatings, i.e. on the basis of respective measurements of such calibration coatings. These calibration coatings correspond to existing letdowns with known formulation and known reflectance data, respectively, which all were applied by the common reference paint application process. Color predictions, using the physical model (also called herein color predicting model), as well as color matching processes are always related with this reference paint application process.

The physical model for the prediction of the reflectance properties of paint (related with the reference paint application process) was extended with an additional application adaption module: The additional module works in interaction with the physical model and is supposed to adapt the predicted reflectance data from the reference paint application process (e.g. liquid state) to a specific target paint application process (e.g. dry state). In conjunction with the physical model it allows to predict reflectance data for various paint application processes based on just only one set of optical constants.

The additional module is configurable by input of specific target application adaption parameters. These application adaption parameters describe differences (or rather a specific transfer function) between the target paint application process in comparison to the respective reference paint application process (e.g. differences between a liquid and a dry paint state). Examples for application adaption parameters are:

Effect flake orientation adaption: better/worse flake orientation (Applicable for effect colors; adjust the lightness-/color-flop behavior of a paint layer)

Effectivity of solid colorants: more/less effective (Adjust the tinting strength differences of solid colorants which could be cause e.g. by shearing effects or by agglomerates)

Effectivity of effect colorants: more/less effective (Adjust differences of the reflection power of effect colorants which could be caused by over-spray losses or settling or leaving effects)

Light loss adaption for wet paint in a cuvette or measuring cell

Conversion factor for the refractive index between wet and dry states

Compensation of "milky" components like e.g. mixing clears in wet paint (which disappear/get transparent in the dry paint)

If e.g. a formulation for an effect color includes aluminum flakes and the specific optical constants for this formulation in liquid state include the scattering coefficient S for this effect pigment then an over-spray loss for the dry state could be compensated within the application adaption module by a simple linear scaling function of the scattering coefficient $S\_dry = c*S\_wet$ where $c<1$. If c would be 0.95 then it implies an over-spray loss of effect flakes of 5%. If e.g. a formulation includes a mixing clear component which has a "milky" appearance in the wet state ($S\_wet>0$, $K\_wet>=0$) but is transparent/invisible in the dry state then this "disappearance-effect" from wet to dry state can be modelled within the application adaption module by setting the specific scattering/absorption coefficients of this mixing clear component ($S\_dry/K\_wet$) to $S\_dry=0$, $K\_dry=0$. This adaption function implies that the optical properties (for the wet state) of this mixing clear component can be ignored within color predictions for the dry state.

The application adaption parameters can also be determined implicit based on an analysis of existing sample(s) (e.g. one or more existing tinting step(s) of a color matching process) which were applied with a common specific paint application process. A list of existing samples from a database (which are related with the specific paint application process, e.g. with a specific wet or dry paint application) could be used for the determination of the respective application adaption parameters.

According to one embodiment of the proposed method, the application adaption parameters for the specific paint application process are calculated, using a numerical method and the color predicting model wherein measured colors and formulations of a plurality of specimen coatings are provided as input parameters and a given cost function is optimized starting from a given set of initial application adaption parameters, wherein the given cost function is chosen as a color distance between the measured colors and predicted colors of the specimen coatings, respectively, and the physical model is configured to predict the colors of the specimen coatings, respectively, by using as input parameters the respective color formulations of the specimen coatings and the specific optical data of the individual color components used in the color formulations of the specimen coatings and respective preliminary application adaption parameters resulting in the course of optimization, wherein the application adaption parameters are calculated by comparing the recursively predicted colors of the specimen coatings with the measured colors of the respective specimen coatings until the given cost function falls below a given threshold. The initial application adaption parameters are neutral parameters. That means that use of the initial application adaption parameters yields to color predictions which are equal to those using the reference paint application process. The given threshold can also be determined dynamically, e.g. indicating a specific state of the minimization that cannot be further improved.

As already mentioned above, the reference paint application process and the specific paint application process differ from each other. According to a further embodiment, the reference paint application process and the specific paint application process are each selected from the group consisting of: applied paint coating in wet state, applied paint coating in dry state, simply paint in wet state.

According to a further aspect, the proposed method is used to determine a target color formulation for a target paint coating which matches a given target color when being applied (on a substrate) using as specific paint application process a given target paint application process that is different from the reference paint application process, the method further comprising:

receiving, via at least one interface, the given target color, receiving, via the at least one interface, application adaption parameters for the given target paint application process, retrieving, from the database, specific optical data of individual color components to be used in the target color formulation of the target paint coating, calculating, using the given target color, the retrieved specific optical data of individual color components and the received application adaption parameters as input parameters for the paint adjustment algorithm, a color formulation with optimized concentrations of individual color components as target color formulation for the target paint coating when the target paint coating is applied (on a substrate) using the given target paint application process.

A "paint coating" may represent herein a paint layer applied on a substrate as well as the respective paint in wet state depending on the used paint application process. The terms "paint coating" and "color coating" are used synonymously herein.

A color formulation specifies the individual color components, i.e. the colorants, and their respective concentrations used in a respective paint coating. The terms "color formulation" and "paint formulation" are used synonymously herein.

That means that the proposed method, i.e. the proposed color adjustment algorithm is capable to match colors for a specific target paint application process which can be different to the reference paint application process.

Generally the "real" measured reflectance data (color) of a sample is always (slightly) different to the predicted reflectance data (color) of the physical model ("sample offset"). Reasons for this sample offset between reality and theory are e.g.:

Model bias: No model is 100% accurate

Statistical error of the instrument: e.g. caused by temperature

Therefore, it is necessary to provide a sample offset. For this purpose, the proposed method further comprises the following steps:

receiving, via at least one interface, data of a color formulation of a sample paint coating as a first solution for the target color to be matched, retrieving, from the database, specific optical data of individual color components used in the color formulation of the sample paint coating, receiving, via the at least one interface, a measured color of the sample paint coating applied on a substrate using the reference paint application process, predicting the color of the sample paint coating using the color predicting model implemented and running on the at least one computer processor, calculating, using the at least one computer processor, an offset of the sample paint coating as difference between the measured color and the predicted color of the sample paint coating, correcting the given target color considering the offset, i.e. introducing the offset into the calculation of the target color formulation.

The color adjustment algorithm will interpret the complete sample offset as model bias and will modify the adjusted formulation in the way that the respective sample offset will be compensated. Here, the application process bias is part of the sample offset. If the application process bias would be non-constant from one adjustment step to another then it would act as element of instability. Depending on the scale of the non-constant sample offset the color adjustment results can be significantly inaccurate because of error propagation.

That means that there might be an application process bias: If e.g. reflectance data of a wet-state paint application process is mixed with data of a dry-state paint application process.

Beside the application adaption to a given target paint application process (e.g. to a specific dry-state paint application process) this invention also describes how to eliminate the application process bias in the sample offset (e.g. a wet-state measurement) within the color adjustment in the case that the sample paint application process differs from the reference paint application process. The improvement of the determination of the sample offset directly improves the quality/accuracy of the adjusted formulation.

The basic idea is that the sample offset consists of an application process bias and a residual error. The residual error includes e.g. the model bias. The application process bias is supposed to be removed from the sample offset, because it is expected to be non-constant part of the sample offset. The residual error of the sample offset will mainly consist of the model bias which will be correctly handled within the adjustment algorithm. This approach is based on the assumption that the model bias for the sample paint application process is similar to the model bias for the target paint application process.

The improved adjustment algorithm uses the application adaption module in conjunction with application adaption parameters to predict for the sample coating (i.e. the first solution in the iterative color adjustment process, respectively, a iterative color matching process) the application process specific reflectance values (predicted color) for the given sample paint application process. The predicted application process specific reflectance values (predicted color) are used to compute the corrected sample offset without an application process bias.

As already mentioned before, the specific application adaption parameters for a sample (e.g. for an existing tinting step of a color matching process) can be defined (e.g. by user input) or determined implicit based on an analysis of its formulation and reflectance data.

The terms "reflectance data" and "color" are used synonymously, herein.

Due to the proposed method, the color adjustment processes converge faster and get more robust and more reliable.

Therefore, according to still a further embodiment of the proposed method, the method is used to determine a target color formulation for a target paint coating which matches a given target color when being applied (on a substrate) using the reference paint application process, the method further comprising:

receiving, via at least one interface, data of a color formulation of a sample paint coating as a first solution for the target color to be matched, retrieving, from the database, specific optical data of individual color components used in the color formulation of the sample paint coating or should additionally be used in the color formulation of the target paint coating, receiving, via the at least one interface, a measured color of the sample paint coating applied (on a substrate) using a sample paint application process which differs from the reference paint application process, receiving application adaption parameters for the sample paint application process, predicting the color of the sample paint coating valid for use with the sample paint application process as specific paint application process, using the color predicting model and the application adaption module, wherein the data of the color formulation of the sample paint coating, the retrieved specific optical data of the individual color components used in the color formulation of the sample paint coating and the application adaption parameters for the sample paint application process are used as input parameters, calculating an offset of the sample paint coating as difference between the measured color and the predicted color of the sample paint coating, and correcting the given target color considering the offset, i.e. introducing the offset into a calculation of the target color formulation, using the paint adjustment algorithm.

The wording "paint coating applied using a paint application process" means in the case that the paint application process results in a paint coating in dry state, respectively corresponds to a dry state, that the paint coating is applied on a substrate using the respective paint application process, and in the case that the paint coating is still in a wet state that the paint application process only provides the paint coating in the wet state for further usage. The wording "applied on a substrate" is only valid for the cases that the respective paint application process comprises a spraying and drying procedure. Therefore, the wording "on a substrate" is written in parantheses.

Furthermore, the method may be used to determine a target color formulation for a target paint coating which matches a given target color when being applied (on a substrate) using as specific paint application process a target paint application process, the method further comprising:

receiving, via at least one interface, data of a color formulation of a sample paint coating as a first solution for the target color to be matched, retrieving, from the database, specific optical data of individual color components used in the color formulation of the sample paint coating or should additionally be used in the color formulation of the target paint coating, receiving, via the at least one interface, a measured color of the sample paint coating applied (on a substrate) using a sample paint application process, receiving, via the at least one interface, application adaption parameters for the sample paint coating, predicting the color of the sample paint coating valid for use with the sample paint application process as specific paint application process, using the color predicting model and the application adaption module, wherein the data of the color formulation of the sample paint coating, the retrieved specific optical data of the individual color components used in the color formulation of the sample paint coating and the application adaption parameters for the sample paint application process are used as input parameters, calculating an offset of the sample paint coating as difference between the measured color and the predicted color of the sample paint coating, and correcting the given target color considering the offset, introducing the offset into a calculation of the target color formulation, using the paint adjustment algorithm receiving, via the at least one interface, application adaption parameters for the target paint application process, calculating, using the target color, the calculated offset and the received application adaption parameters for the target paint application process as input parameters for the paint adjustment algorithm, a color formulation with optimized concentrations of individual color components as target color formulation for the target paint coating when the target paint coating is applied (on a substrate) using the target paint application process.

The present invention also refers to a system which comprises at least:

a database which comprises individual color components, such as pigments and/or pigment classes, and specific optical data associated with the respective individual color components, the specific optical data of the individual color components being determined on the basis of known reference paint coatings with known reference color formulations and known measured reference colors, the reference paint coatings being applied (on a substrate) using a reference paint application process, respectively, at least one computer processor, which is in communicative connection with the database, and programmed to execute the method as proposed herein.

The system may further comprise an input device that is configured to receive, via an appropriate interface, such as USB, an input of data. Such input device can be a computer keyboard, a microphone, a video camera, a data carrier or any combination thereof. The system may further comprise an output device that is configured to output, and in particular to display, the respective results calculated by carrying out one of the above methods. The output device is one of the group comprising at least: acoustic device, haptic device, display device and any combination thereof. The output device is in a communicative connection, via a respective interface, with the at least one computer processor.

Furthermore, the present invention refers to a non-transitory computer readable medium with a computer program with program codes that are configured and programmed, when the computer program is loaded and executed by at least one computer processor which is in communicative connection with a database which comprises individual color components, such as pigments and/or pigment classes, and specific optical data associated with the respective individual color components, the specific optical data of the individual color components being determined on the basis of known reference paint coatings with known reference color formulations and known measured reference colors, the reference paint coatings being applied (on a substrate) using a reference paint application process, respectively, to execute the method as proposed herein.

Each of the communicative connections between the different components may be a direct connection or an indirect connection, respectively. Each communicative connection may be a wired or a wireless connection. Each suitable communication technology may be used. The database and the at least one computer processor, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The computer-readable medium suitable for storing the computer program instructions (i.e. program codes) and data include all forms of non-volatile memory and memory devices, including by way of example semiconductor memory devices, e.g. erasable programmable read-only memory (EPROM), electrically-erasable programmable read-only memory (EEPROM), and flash memory devices; magnetic disks, such as, internal hard disks or removable disks; magneto-optical disks; optical disks; CD-ROM, DVD+R, DVD-R. DVD-RAM, and DVD-ROM disks or a combination of one or more thereof. Such memory device may store various objects or data, including caches, classes, applications, backup data, jobs, web pages, web page templates, database tables, repositories storing dynamic information, and any other appropriate information including any parameters, variables, algorithms, instructions, rules, constraints, and/or references thereto. Additionally, the memory may include any other appropriate data, such as policies, logs, security or access data, reporting files, as well as others. The computer processor and the memory device can be supplemented by, or incorporated in, special purpose logic circuitry.

The computer program instructions can be a computer program, a software application, a module, a software module, a script, or code, and can be written in any form of programming language, including compiled or interpreted languages, or declarative or procedural languages. The instructions can be deployed in any form, including as a stand-alone computer program or as a module, component, subroutine, or other unit suitable for use in a computing environment. In one embodiment, the computer-executable instructions (i.e. program codes) of the present disclosure are written in HTML, TS (TypeScript), and CSS (Cascading Style Sheets).

A computer program may, but need not, correspond to a file in a respective file system. A computer program can be stored in a portion of a file that holds other computer programs or data, e.g., one or more scripts stored in a markup language document, in a single file dedicated to the computer program in question, or in a plurality of coordinated files, e.g., files that store one or more modules, sub-programs, or portions of code. A computer program can be deployed to be executed on one computer or on a plurality of computers that are located at one site or distributed across a plurality of sites and interconnected by a communication network. Portions of the computer programs may be designed as individual modules that implement the various features and functionality through various objects, methods, or other processes. Alternatively, the computer programs may instead include a number of sub-modules, third-party services, components, libraries, and such, as appropriate.

Conversely, the features and functionality of various components can be combined into single components as appropriate.

Systems suitable for the execution of the method of the present disclosure can be based on general or special purpose microprocessors, both, or any other kind of CPU. Generally, a CPU will receive instructions and data from a read-only memory (ROM) or a random access memory (RAM) or both. Essential elements of the system are a CPU for performing or executing instructions (i.e. program codes) and one or more memory devices (such as the database) for storing instructions (i.e. program codes) and data. Generally, the system includes, or is operatively coupled to at least one memory device and is configured to receive data from or transfer data to, or both, the at least one memory device for storing data. Such memory device comprises e.g., magnetic, magneto-optical disks, or optical disks. However, the system need not have such devices. Moreover, the system can be embedded in another device, e.g., a mobile telephone, a personal digital assistant (PDA), or a portable storage device, e.g., a universal serial bus (USB) flash drive, to name just a few.

Color matching is an iterative process. Starting with a match from scratch and continuing with several adjustment steps until an adequate formulation is found the color matching process is time consuming and expensive. Today the tolerances for a target color are defined for dry paint. However, generally the paint is sold as liquid product. The optical properties of paint in the dry state are not equal to the properties of paint in the liquid (wet) state. That's why today each tinting step of the color matching process has to be sprayed in order to verify if its dry color matches the tolerance for the paint in the dry state. The method described herein allows to perform the adjustment process completely in the liquid state in order to get rid of all paint applications for all tinting steps. This invention describes a method which allows an adjustment process based on wet sample coatings, i.e. on sample coatings in wet state, i.e. that are not further processed by a drying procedure and probably even not by a spraying procedure.

One main object of this invention was to be able to use measured reflectance data of samples/tinting steps in wet state within a color matching process for a dry color standard, i.e. a target color in a dry state.

There are two potential use cases for the new developed application adaption method:
1. Color matching process for a dry color standard based on optical constants for wet paint:
   All samples/tinting steps are measured in a wet state
   The reflectance data for all samples/tinting steps is predicted without an application adaption for a wet state
   The corresponding sample offset for the wet paint state is considered within the adjustment algorithm
   The predicted reflectance data for an adjusted formulation is transformed by use of appropriate application adaption parameters from a wet state to the dry reference paint application process, i.e. to the reference paint application process which comprises a spraying and drying procedure.
2. Color matching process for a dry color standard based on optical constants for a dry reference application process:
   All samples/tinting steps are measured in a wet state
   The predicted reflectance data for all samples/tinting steps is transformed by use of appropriate application adaption parameters from the dry reference application process to a wet state
   The corresponding sample offset for the wet paint state is considered within the paint adjustment algorithm
   The reflectance data for an adjusted formulation is predicted without an application adaption for the dry reference application process The terms "wet paint", "wet color", "paint in wet state", "color in wet state" are used synonymously herein. The terms "dry color", "dry paint", "paint in dry state" and "color in dry state" are used synonymously herein.

The following description is presented and is provided in the context of one or more particular implementations. Various modifications to the disclosed implementations will be readily apparent to a person skilled in the art, and the general principles defined herein may be applied to other implementations and applications without departing from the scope of the disclosure.

Implementations of the subject matter and the functional operations described in this disclosure can be implemented in digital electronic circuitry, in tangibly-embodied computer software, in computer hardware, including the structures disclosed in this disclosure and their structural equivalents, or in combinations of one or more of them. Implementations of the subject matter described in this disclosure can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to a suitable receiver device for execution by the at least one computer processor.

The details of one or more implementations of the subject matter of this specification are set forth in the accompanying drawings and the description. Other features, aspects, and advantages of the subject matter will become apparent from the description, the drawings, and the claims.

DETAILED DESCRIPTION OF THE DRAWINGS

Identical units or components are provided with identical reference signs across all figures.

Figure 1:
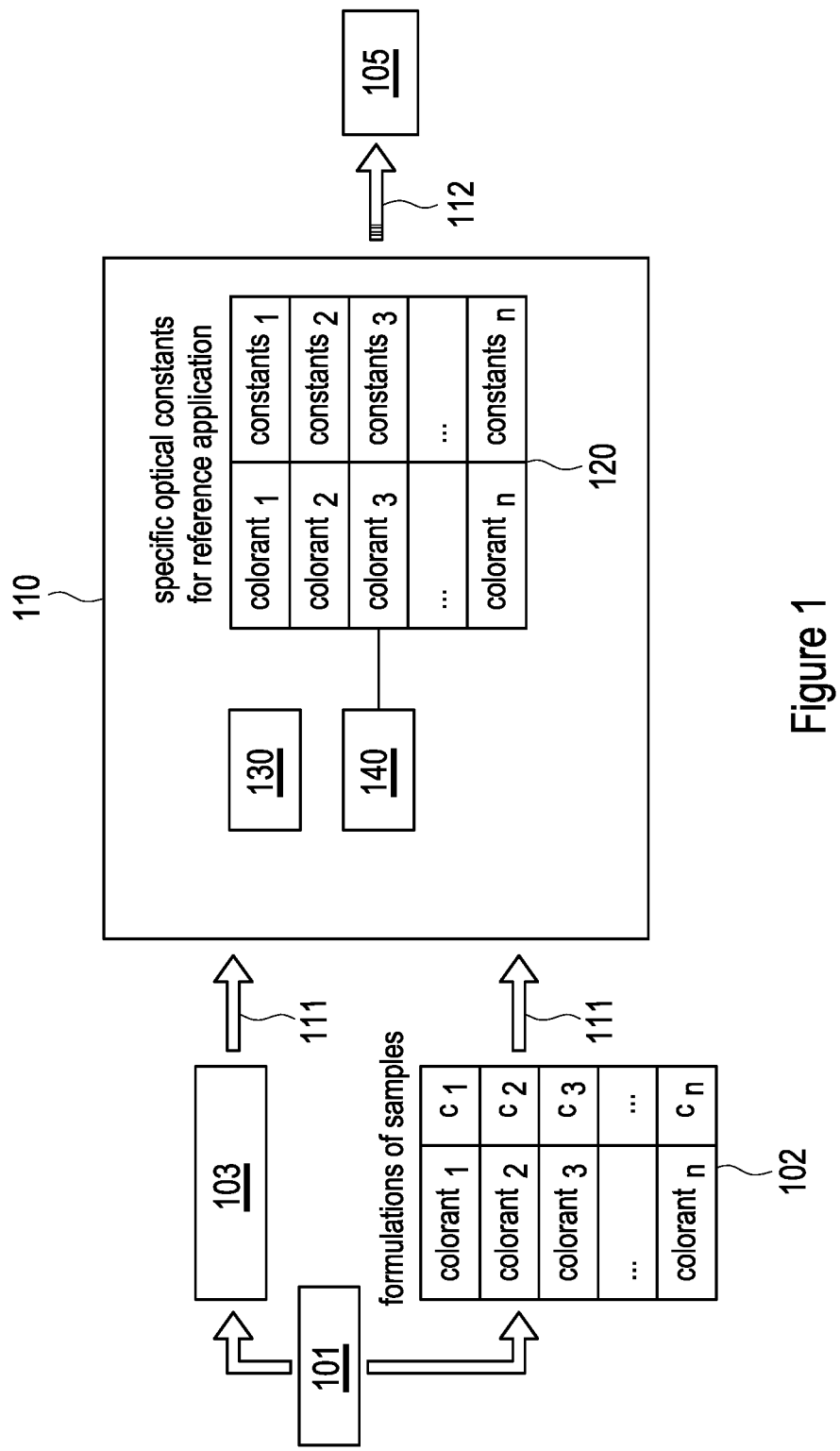
FIG. 1 shows schematically how to determine application adaption parameters as provided according to an embodiment of the method according to the present invention.

FIG. 1 shows an embodiment of a system according to the present invention. The system comprises a computer processor 110 and a database 120. The database 120 comprises individual color components, colorant$_1$, colorant$_2$, colorant$_3$, ..., colorant$_n$, such as pigments and/or pigment classes, and specific optical data, constants$_1$, constants$_2$, constants$_3$, ..., constants$_n$, associated with the respective individual color components, the specific optical data of the individual color components being determined on the basis of known reference paint coatings with known reference color formulations and known measured reference colors, the reference paint coatings being applied (onto a substrate) using a reference paint application process, respectively. The computer processor 110 is in communicative connection with the database 120, and programmed to execute an embodiment of the method according to the present invention as described herein. Application adaption parameters provided or to be provided in the proposed method can, in addition to a manual input, also be determined implicitly as follows:

The application adaption parameters can be computed based on data of existing tinting steps, respectively of existing sample paint coatings 101.

These sample paint coatings 101 are applied (on a substrate) using a specific paint application process. The respective colors 103 of the sample paint coatings 101 are measured. Data of the respective color formulations 102 of the respective sample paint coatings 101 are provided wherein a respective color formulation 102 specifies all included colorants, colorant$_1$, colorant$_2$, colorant$_3$, ... colorant$_n$ with their respective concentrations, $c_1$, $c_2$, $c_3$, ..., $c_n$. In the case that the specific paint application process comprises a spraying and drying procedure, the respective sample coatings are applied on a substrate, respectively. Alternatively, the sample paint coatings are applied using the specific paint application process means that the specific paint application process merely comprises providing the respective sample paint coatings in a wet state, respectively, e.g. in a cuvette or in a custom glass-cell. In the latter case, the sample paint coatings may be sprayed on a substrate but not dried yet.

The data of the color formulations 102 of the sample paint coatings 101 are received via at least one interface 111 of the computer processor 110. Furthermore, the measured colors 103 of the sample paint coatings 101 are received via the at least one interface 111 of the computer processor 110.

A numerical method 130 and a physical model 140 are provided and implemented on the computer processor 110. The numerical method 130 is configured to optimize application adaption parameters by minimizing a given cost function starting from a given set of initial application adaption parameters. The initial application adaption parameters are neutral parameters. That means that use of the initial application adaption parameters yields to color predictions which are equal to those using the reference paint application process. The given cost function is chosen as a color distance between the measured color 103 of a respective one of the existing sample paint coatings 101 and a predicted color of the respective sample paint coating. The physical model is configured to predict the color of the respective sample paint coating by using as input parameters the color formulation 102 of the respective sample paint coating, specific optical data of the individual color components used in the color formulation 102 of the respective sample paint coating, and respective preliminary application adaption parameters resulting in the course of optimization. The specific optical data are retrieved from the database 120. The specific optical properties of colorants are determined based on data of existing letdowns/test specimen with known formulation and known reflectance data which all were applied (on a substrate) by a common reference paint application process which is or may be different from the specific paint application process. Therefore, color predictions of the physical model are related with this reference paint application method.

By using the computer processor 110 and using the numerical method 130 and the physical model 140 implemented and running on the computer processor 110, the application adaption parameters 105 are calculated by comparing the recursively predicted color of the respective sample paint coating with the measured color 103 of the respective sample paint coating until the given cost function falls below a given threshold. The given threshold can also be determined dynamically, e.g. indicating a specific state of the minimization that cannot be further improved.

The application adaption parameters 105 that are then considered optimised are output, via an interface 112, on an output device such as a display.

The calculated optimized application adaption parameters 105 are made available and output via the further interface 112. These calculated optimized application adaption parameters 105 are characteristic for the one specific paint application process. The method may be executed for a plurality of different given specific paint application processes, such as a wet state and a dry state depending on which paint application process the reference paint application process corresponds to. That means that in the case the reference paint application process corresponds to the dry state, application adaption parameters for the wet state are necessary if sample coatings and/or target coatings in the wet state are involved in a respective color adjustment process. Furthermore, in the case the reference paint application process corresponds to the wet state, application adaption parameters for the dry state are necessary if sample coatings and/or target coatings in the dry state are involved in the color adjustment process. The respective application adaption parameters calculated for a respective one of the different given specific paint application processes may then be retrievably stored in a repository and assigned to the respective one of the different given specific paint application processes as process-specific application adaption parameters. These process-specific application adaption parameters can then be called from the repository at any time on request.

Figure 2:
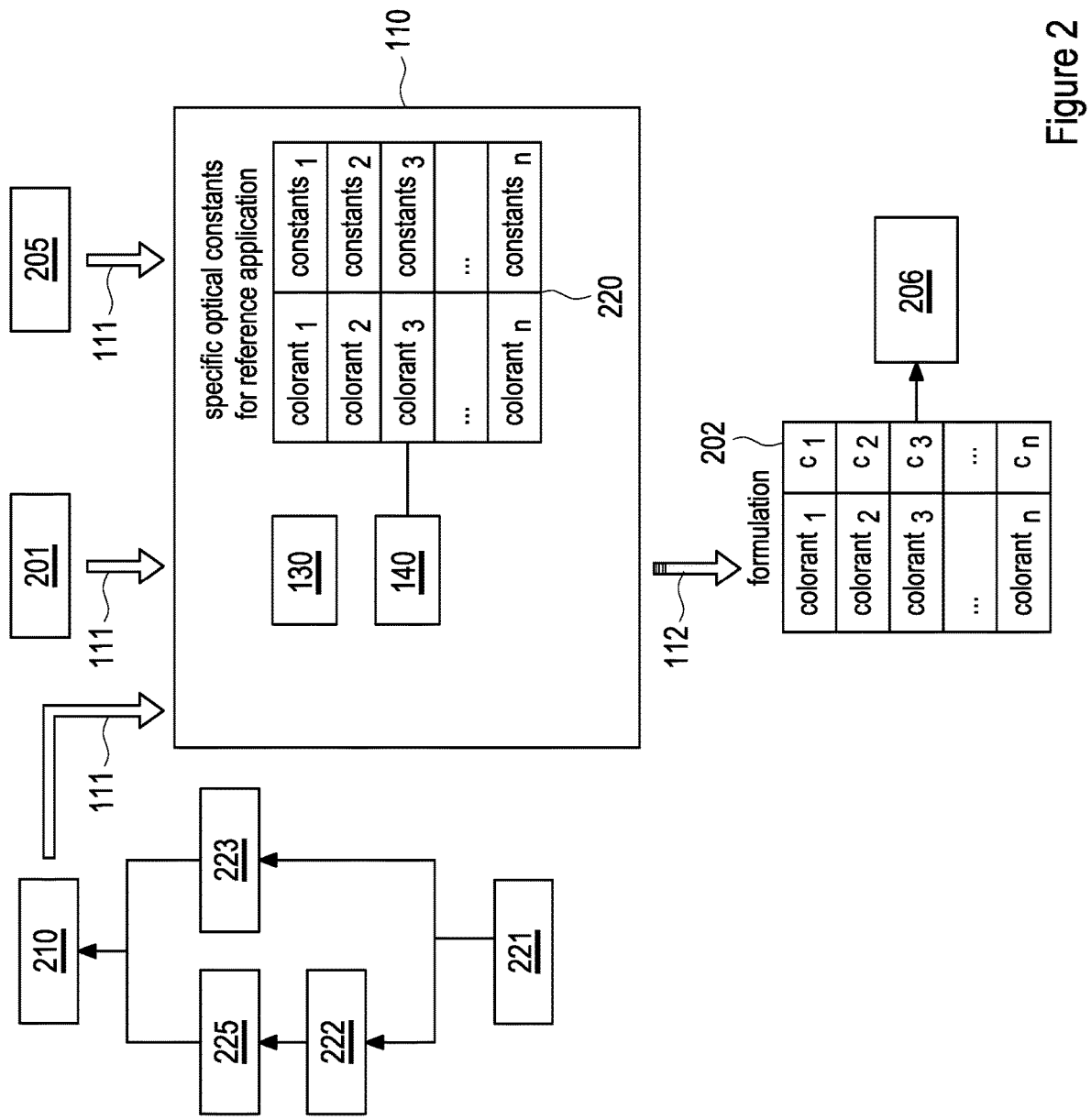
FIG. 2 shows schematically a course of a further embodiment of the method according to the present invention.

FIG. 2 shows schematically a course of a further embodiment of the method according to the present invention.

Generally a matching process starts with a match from scratch or a search in a formulation database for a given target color 201. The target color 201 is here in a dry state, i.e. a respective target coating appearing as the target color 201 is in a dry state, i.e. the respective target coating is applied (sprayed) on a substrate and dried. The respective paint application process, therefore, consists of a combination of a spraying and a drying procedure which is also called a dry paint application process herein. As already mentioned above, the terms "paint application process" and "state" are used synonymously herein.

Thus, it is stated that a color in a dry state can also be described as color or paint coating using a dry paint application process. By analogy, a color in a wet state can also be described as color or paint coating using a wet paint application process which does not comprise a drying procedure, and probably even not a spraying procedure.

The first solution is typically not close enough to the target color 201. Therefore, the physical model 140, also called herein color predicting model, is used in combination with the numerical optimization algorithm 130 to obtain an optimised formulation 202 by iteration. The target paint formulation 202 specifies all included colorants, $colorant_1$, $colorant_2$, $colorant_3$, . . . $colorant_n$ with their respective concentrations, $c_1$, $c_2$, $c_3$, . . . , $c_n$. The physical model 140 uses a database 220 as a basis for the color prediction. The database 220 comprises individual color components, $colorant_1$, $colorant_2$, $colorant_3$, . . . , $colorant_n$, such as pigments and/or pigment classes, and specific optical data, $constants_1$, $constants_2$, $constants_3$, . . . , $constants_n$, associated with the respective individual color components. The specific optical properties of colorants are determined based on data of existing letdowns/test specimen with known formulation and known reflectance data which all were applied by a common reference paint application process which corresponds here to a wet paint application process, respectively a wet state. However, when looking for a formulation 202 of a paint coating whose color matches the target color 201 wherein the paint coating is to be applied on a substrate using a dry paint application process and, therefore, other than the wet paint application process as reference paint application process, the characteristic of dry paint application process compared to the wet paint application process are taken into account by providing respective dry application adaption parameters 205 for the dry paint application process as specific paint application process which are calculated as exemplarily described in FIG. 1.

The target color 201 and the target application adaption parameters 205 are received by the computer processor 110, on which the physical model 140 and the numerical optimization algorithm 130 are implemented and running, via an interface 111. In order to determine the formulation 202 for the paint coating whose color matches the target color 201 when being applied on a substrate using the target paint application process, i.e. the respective dry paint application process, the target color 201, the target application adaption parameters 205 and the specific optical constants of the available colorants from the database 220 are used and an optimized formulation 202 is iteratively determined. This formulation 202 and its predicted color 206 when being applied using the target paint application process, i.e. the respective dry paint application process, can be output via an interface 112 on an output device. The predicted color 206 is composed of a true color of the optimized formulation 202 when being applied on a substrate using the dry paint application process, and a systematical bias which corresponds to a model bias 210 (see FIG. 5 for detailed explanation). Due to the inclusion of the target application adaption parameters 205 in the calculation, there is no paint application process bias.

Figure 3:
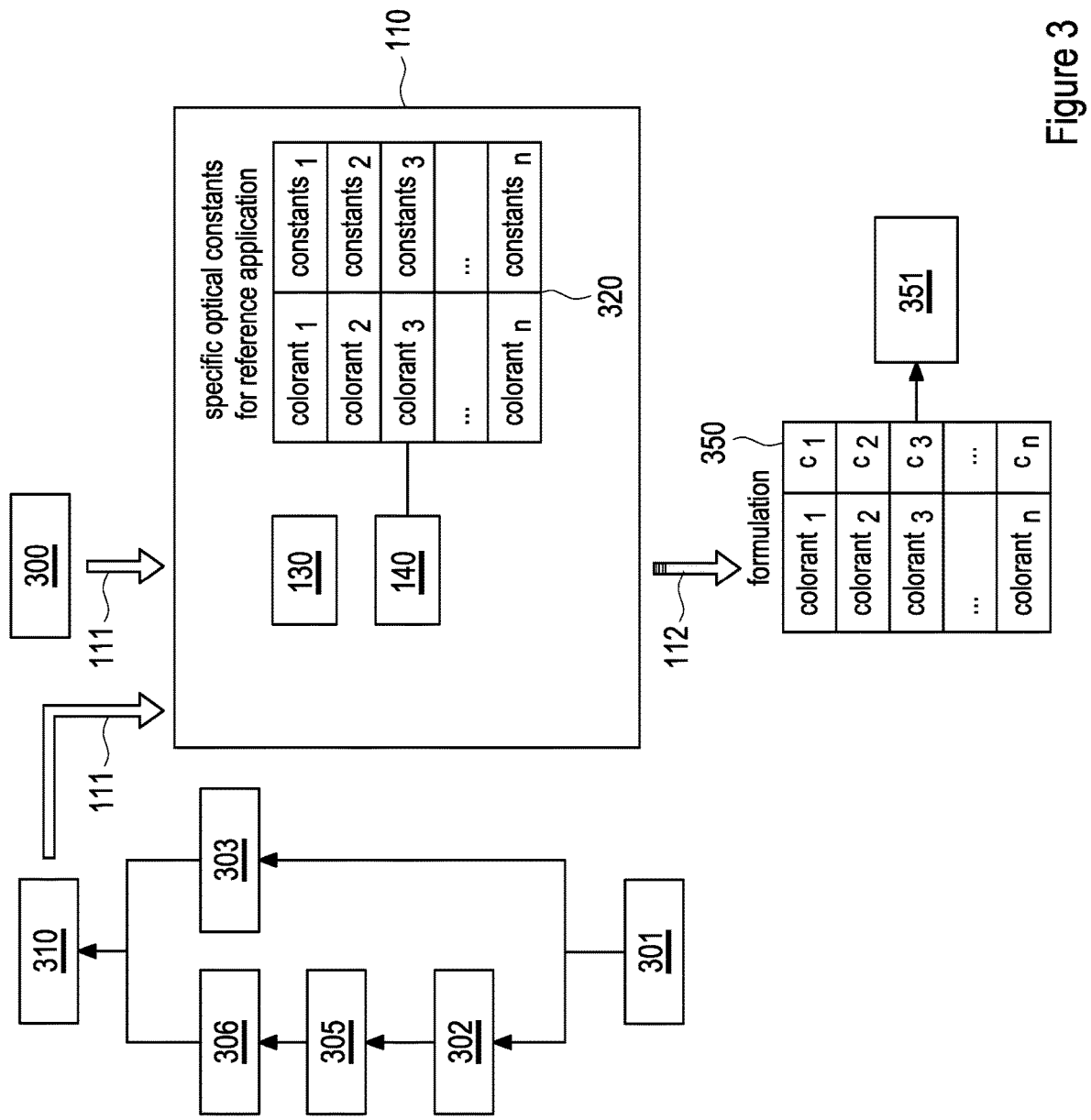
FIG. 3 shows schematically a course of another embodiment of the method according to the present invention.

In order to determine the model bias, i.e. the offset 210, the method further comprises the steps of
  receiving, via the interface 111, data of a color formulation 222 of a sample paint coating 221 as a first solution for the target color 201 to be matched,
  retrieving, from the database 220, specific optical data of individual color components used in the color formulation 222 of the sample paint coating 221,
  receiving, via the interface 111, a measured color 223 of the sample paint coating 221 applied using the reference paint application process, i.e. the wet paint application process, i.e. the measured color 223 of the sample paint coating 221 is provided in the wet state,
  predicting the color 225 of the sample paint coating 221 valid for the reference paint application process, i.e. here the wet state, using the color predicting model 140 implemented and running on the processor 110,
  calculating, using the processor 110, the offset 210 as difference between the measured color 223 and the predicted color 225 of the sample paint coating 221,
  correcting the given target color 201 considering the offset 210, respectively providing the offset 210 as further input parameter via the interface 111 for the color adjustment algorithm consisting of a combination of the numerical optimization algorithm 130 and the color predicting model 140. Generally, the physical model, i.e. the color predicting model 140 needs for predicting the color, i.e. for determining the theoretic color of the preliminary paint formulations during the iterative process of the color adjustment algorithm all available pigments and its respective specific optical data stored in the database 120. Mostly the first solution 221 and the finally determined target color formulation 202 comprise the same pigments, but sometimes there are additional pigments necessary for the target color formulation 202. FIG. 3 shows schematically a course of another embodiment of the method according to the present invention.

A color adjustment process for a given target color 300 starts with a sample 301, e.g. an existing tinting step or a search result of a search in a formulation database as a first solution. So far, the existing sample 301 must have been applied with the reference paint application process because the color adjustment algorithm is based on the assumption that a model bias is constant for all formulations which are close to the sample formulation. However, as already explained above, real samples or sample coatings need not be applied with the reference paint application process, which corresponds here to a dry paint application process, but can be applied with a sample paint application process which corresponds here to a wet paint application process. This causes a contribution to the systematical bias of a respective sample offset. If this contribution of the sample paint application process to the sample offset is not considered, results of the color adjustment process will be significantly inaccurate.

The first solution 301 is here a sample coating which has been applied using a wet paint application process while the target color 300 is in a dry state. In order to be able to make a color prediction for an optimized paint formulation for the target color 300 in the dry state even when samples are used in the wet state, an offset 310 must be determined which compensate for such difference, i.e. which takes account for such a transform between wet paint application process and dry paint application process. The first solution 301 is typically not close enough to the target color 300. An adjustment of the first solution 301 is applied where the offset 310 between the predicted reflectance data 306 and the measured reflectance data 303 for the first solution 301 is considered.

So the adjusted formulation is a function of the target color 300 and the offset 310 between the predicted reflectance data 306 and the measured reflectance data 303 of the first solution 301. If the measured reflectance data 303 of the first solution 301 includes a bias caused by variations within the paint application process then this error will propagate into the following formulation within the iterative color matching process.

Therefore, it is proposed to avoid such paint application process bias by taking into account the diversity of the paint application processes already in the first iteration step, i.e. when considering the first solution 301.

The offset 310 which is independent of the paint application process is calculated on the basis of the first solution 301. A sample formulation 302 of the first solution 301 is known. The first solution 301 is applied as paint coating using the sample paint application process, i.e. the respective wet paint application process, and its color is measured. The measured color 303 of the first solution 301 is provided. The measured color 303 comprises a true color, a systematical bias and a statistical error. Furthermore, the physical model 140 is used to predict the color of the first solution 301 on the basis of the known formulation 302. As the physical model 140 uses the database 120 and is, thus, related to the reference paint application process, i.e. to the respective dry paint application process, the sample paint application process is taken into account by combining the physical model 140 with the sample application adaption parameters 305 which are determined for the wet paint application process as specific paint application process and as explained in FIG. 1. The predicted color 306 of the first solution 301 is now predicted on the assumption that the underlying formulation 302 is applied as paint coating using the sample paint application process. Therefore, both the measured color 303 and the predicted color 306 refer to the same paint application process, i.e. the wet paint application process. The offset 310 as difference between the measured color 303 and the predicted color 306 is, therefore, independent of the underlying paint application process, i.e. the wet state. This offset 310 can now be used for the iterative adjustment process which is based here on the dry state as reference paint application process.

As the first solution 301 is typically not close enough to the target color 300, the physical model 140 is used in combination with the numerical optimization algorithm 130 to obtain an optimised formulation 350 by iteration. The target paint formulation 350 specifies all included colorants, $colorant_1$, $colorant_2$, $colorant_3$, . . . $colorant_n$ with their respective concentrations, $c_1$, $c_2$, $c_3$, . . . , $c_n$. The physical model 140 uses a database 320 as a basis for the color prediction. The database 320 comprises individual color components, $colorant_1$, $colorant_2$, $colorant_3$, . . . , $colorant_n$, such as pigments and/or pigment classes, and specific optical data, $constants_1$, $constants_2$, $constants_3$, . . . , $constants_n$, associated with the respective individual color components. The target color 300 is combined with the calculated offset 310 in order to account for the model bias and the statistical error both are assumed to be similar for the sample and the paint formulation for the target color 300.

The target color 300 and the offset 310 are received by the computer processor 110, on which the physical model 140 and the numerical optimization algorithm 130 are implemented and running, via an interface 111. In order to determine the formulation 350 for a paint coating whose color matches the target color 300 when being applied on a substrate using the reference paint application process, i.e. the respective dry paint application process, the target color 300, the offset 310 and the specific optical constants of the available colorants from the database 320 are used and an optimized formulation 350 is iteratively determined. This formulation 350 and its predicted color 351 when being applied using the reference paint application process, can be output via an interface 112 on an output device. The predicted color 351 is composed of a true color of the optimized formulation 350 when being applied on a substrate using the reference paint application process, and a statistical error of sample. Due to the inclusion of the offset 310 which is relieved of the wet application process bias, there is no wet application process bias any more.

Figure 4:
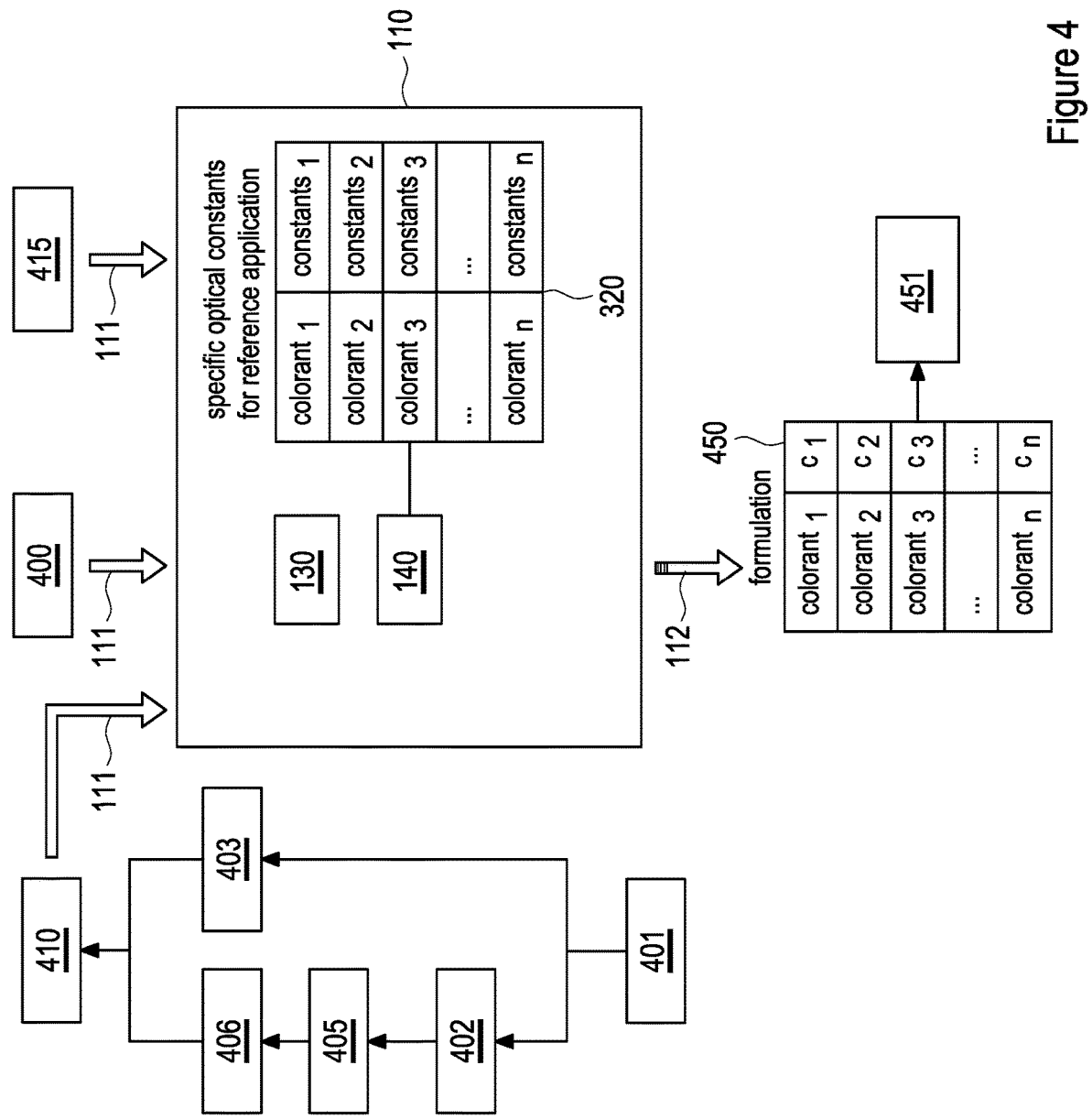
FIG. 4 shows schematically a course of still another embodiment of the method according to the present invention.

FIG. 4 shows schematically a course of still another embodiment of the method according to the present invention.

A matching process starts with a match from scratch or a search in a formulation database for a target color 400.

The term "match from scratch" comprises a color matching method which manages without information about an existing sample coating as a first solution. This method is applied e.g. if no formulation database is available or if no adequate first solution is found in a formulation database. In practice the "match from scratch" method often starts with a pre-selection step of components which are expected to be in the target color. This pre-selection step is not mandatory. The "match from scratch" method/algorithm computes as a first solution one or more preliminary matching formulas for the target color. This/these preliminary matching formula(s) can be sprayed and/or adjusted in a following step.

In comparison to a "color adjustment method", where a sample coating as first solution is available which is used to improve the color prediction accuracy of the physical model (e.g. based on an approximation of the model error by an analysis of the "sample offset"), the accuracy of a "match from scratch" method is typically lower.

A first solution 401 is typically not close enough to the target color 400. An adjustment of the first solution 401 is applied where an offset 410 between predicted reflectance data 406 and measured reflectance data 403 for the first solution 401 is considered.

So the adjusted formulation is a function of the target color 400 and the offset 410 between the predicted reflectance data 406 and the measured reflectance data 403 of the first solution 401. If the measured reflectance data 403 of the first solution 401 includes a bias caused by variations within the paint application process then this error will propagate into the following formulation within the iterative color matching process. In the case shown here, the sample paint application process is a wet state, respectively a wet paint application process, while the reference paint application process is a dry paint application process, respectively a dry state.

Therefore, it is proposed to avoid such paint application process bias by taking into account the diversity of the paint application processes already in the first iteration step, i.e. when considering the first solution 401.

The offset 410 which is independent of the paint application process is calculated on the basis of the first solution 401. A formulation 402 of the first solution 401 is known. The first solution 401 is provided as paint coating using the wet paint application process and its color is measured. The measured color 403 of the first solution 401 is provided. Furthermore, the physical model 140 is used to predict the color of the first solution 401 on the basis of the known formulation 402. As the physical model 140 uses the database 320 and is, thus, related to the respective dry paint application process as reference paint application process, the wet paint application process is taken into account by combining the physical model 140 with the wet application adaption parameters 405. The predicted color 406 of the first solution 401 is now predicted on the assumption that the underlying formulation 402 is applied/provided as paint coating using the wet paint application process. Therefore, both the measured color 403 and the predicted color 406 refer to the same wet paint application process. The offset 410 as difference between the measured color 403 and the predicted color 406 is, therefore, independent of the underlying wet paint application process. This offset 410 can now be used for the iterative adjustment process, i.e. the offset 410 is used as further input parameter of the paint adjustment algorithm.

Furthermore, it is desired here to get a solution for the target paint formulation whose predicted color matches the target color 400 in a dry state which is different from the reference paint application process which is also a dry paint application process. It is possible that the included spraying procedure is different. There are a number of factors which can vary. Therefore, besides the target color 400 and the offset 410, target application adaption parameters 415 are provided as further input parameters for the color adjustment algorithm in order to account for the differences between the different dry paint application processes, i.e. between the target paint application process and the reference paint application process. An optimized target paint coating 450 is provided via an interface 112 whose predicted color 451 best matches the target color 400 when being applied on a substrate using the target paint application process. The target paint formulation 450 specifies all included colorants, $colorant_1$, $colorant_2$, $colorant_3$, . . . $colorant_n$ with their respective concentrations, $c_1$, $c_2$, $c_3$, . . . , $c_n$.

Figure 5:
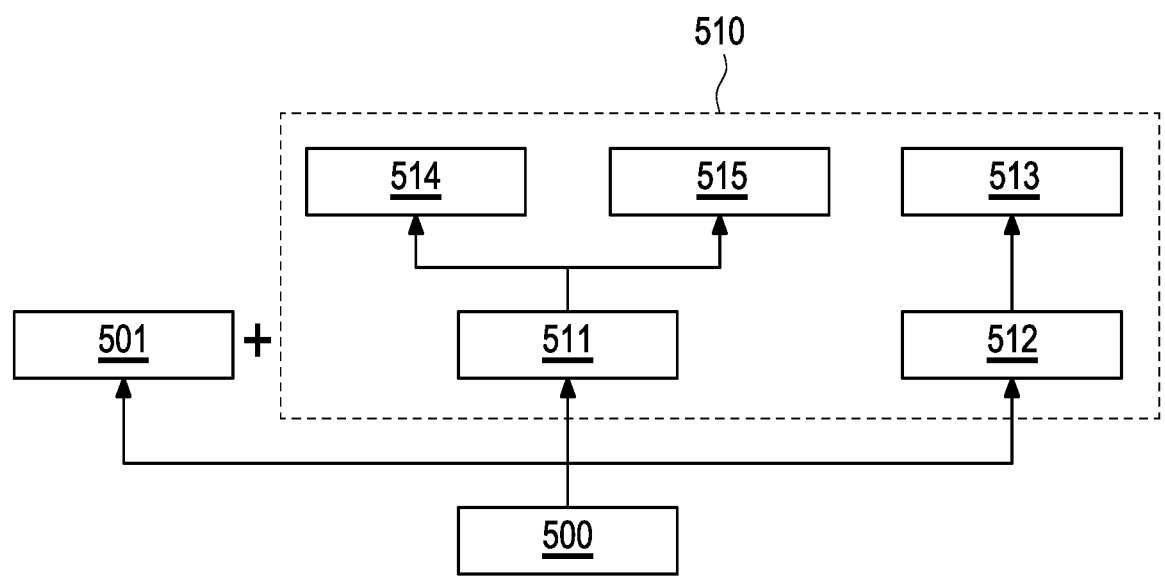
FIG. 5 shows a schematic block diagram that illustrates a sample offset for a color matching process.

FIG. 5 shows a schematic block diagram that illustrates an offset which must be cleared of an application process bias according to an embodiment of a method according to the present invention. For real samples a measured sample color 500 is always (slightly) different to a predicted sample color which has been predicted, using a physical model. The measured sample color 500 can be expressed as a combination of a true color 501 and an offset 510. The offset 510, also called sample offset 510, corresponds to a difference between the measured sample color 500 and the predicted sample color. Reasons for this sample offset 510 between reality (measurement) and theory (physical model) are e.g.:

Model bias 514: No model is 100% accurate

Application process bias 515: i.e. how the sample has been applied when the sample color is measured, e.g. in wet state or in dry state (or using a dry application process other than a respective dry reference application process)

Statistical error 512 of an instrument 513, e.g. caused by temperature

So far, a color adjustment algorithm, i.e. a paint color formulation calculation algorithm interprets the complete sample offset 510 as model bias and modifies an adjusted paint formulation in the way that the respective sample offset 510 will be compensated. That means that the application process bias 515 is part of the sample offset 510. If the application process bias 515 is non-constant, then it acts as element of instability. Depending on the scale of the sample offset 510 the color adjustment results can be significantly inaccurate because of error propagation.

The proposed method of the invention serves to eliminate such application process bias 515 in the sample offset 510, herein also simply called offset 510. The improvement of the accuracy of the sample offset 510 directly improves the quality/accuracy of the adjusted paint formulation. The offset 510 of a sample between the measured color 500 and the predicted color is analyzed regarding a potentially included application process bias 515 in the measured color 500. As mentioned before, the offset 510 comprises a systematical bias 511 and a statistical bias 512, also called statistical error 512. The statistical bias 512 can be caused by an instrument 513 (limited accuracy) and is typically small in comparison to the systematical bias so that it can be neglected. The systematical bias 511 comprises the model bias 514 (which is expected to be constant) and the application process bias 515 (which could be non-constant).

A basic idea of the proposed method is to decompose the sample offset 510 with the proposed application adaption module into an application process bias 515 and a residual part which comprises the model bias 514 and the statistical bias 512. The application process bias 515 is supposed to be removed from the sample offset 510, because it is defined to be non-constant. The residual part of the sample offset 510 will mainly consist of the model bias 514 which will be correctly handled within the paint adjustment algorithm.

LIST OF REFERENCE SIGNS 101 sample
102 formulation
103 measured sample color
105 predicted sample color
110 computer processor
111 input interface
112 output interface
120 formulation database
130 physical model, color predicting model
140 numerical optimization algorithm
201 dry target color
202 sample formulation
205 dry target application adaption parameters
206 predicted color for dry target paint application process
210 computer processor
220 database for wet reference paint application process
221 sample
222 formulation
223 wet measured color
225 wet predicted color
300 dry target color
301 sample
302 formulation
303 wet measured sample color
305 wet sample application adaption parameter
306 wet predicted sample color
310 wet sample offset
320 database for dry reference application
350 formulation
351 predicted color for dry reference paint application process
400 target color
401 sample
402 formulation
403 measured sample color
405 sample application adaption parameters
406 predicted sample color
410 offset 415 target application adaption parameters
450 formulation
451 predicted color for target application
500 measured sample color
501 true color
510 offset
511 systematical bias
512 statistical error, statistical bias
513 instrument
514 model bias
515 application process bias

The invention claimed is:

1. A computer-implemented color matching method using a paint adjustment algorithm running on at least one computer processor and a database which comprises specific optical data of individual color components, the specific optical data of the individual color components being determined on the basis of known reference paint coatings with known reference color formulations and known measured reference colors, the reference paint coatings being applied on a substrate using a reference paint application process, respectively, wherein the paint adjustment algorithm is extended by an application adaption module which interworks with a color predicting model of the paint adjustment algorithm, and which is configured to receive application adaption parameters for a specific paint application process as input parameters, and to transform, using the received application adaption parameters, a color predicted by the color predicting model for use with the reference paint application process, into a transformed color valid for use with the specific paint application process.

2. The method according to claim 1, wherein the application adaption parameters for the specific paint application process are calculated using a numerical method and the color predicting model wherein measured colors and color formulations of a plurality of specimen coatings are provided as input parameters and a given cost function is optimized starting from a given set of initial application adaption parameters, wherein the given cost function comprises a color distance between the measured colors and predicted colors of the specimen coatings, respectively, and the color predicting model is configured to predict the colors of the specimen coatings, respectively, by using as input parameters the respective color formulations of the specimen coatings and the specific optical data of the individual color components used in the color formulations of the specimen coatings and respective preliminary application adaption parameters resulting in the course of optimization, wherein the application adaption parameters are calculated by comparing the recursively predicted colors of the specimen coatings with the measured colors of the respective specimen coatings until the given cost function falls below a given threshold.

3. The method according to claim 1, wherein the reference paint application process and the specific paint application process differ from each other and are each selected from the group consisting of: applied paint coating in wet state, and applied paint coating in dry state.

4. The method according to claim 1 to determine a target color formulation for a target paint coating which matches a given target color when being applied on a substrate using as specific paint application process a given target application process that is different from the reference paint application process, the method further comprising:
receiving, via at least one interface, the given target color,
receiving, via the at least one interface, application adaption parameters for the given target application process,
retrieving, from the database, specific optical data of individual color components to be used in the target color formulation of the target paint coating,
calculating, using the given target color, the retrieved specific optical data and the received application adaption parameters as input parameters for the paint adjustment algorithm, a color formulation with optimized concentrations of individual color components as target color formulation for the target paint coating when the target paint coating is applied on a substrate using the given target paint application process.

5. The method according to claim 4 further comprising:
receiving, via at least one interface, data of a color formulation of a sample paint coating as a first solution for the target color to be matched,
retrieving, from the database, specific optical data of individual color components used in the color formulation of the sample paint coating,
receiving, via the at least one interface, a measured color of the sample paint coating applied on a substrate using the reference paint application process,
predicting the color of the sample paint coating using the color predicting model implemented and running on the at least one computer processor,
calculating, using the at least one computer processor, an offset of the sample paint coating as difference between the measured color and the predicted color of the sample paint coating, and
introducing the offset into the calculation of the target color formulation.

6. The method according to claim 1 to determine a target color formulation for a target paint coating which matches a given target color when being applied on a substrate using the reference paint application process, the method further comprising:
receiving, via at least one interface, data of a color formulation of a sample paint coating as a first solution for the target color to be matched,
retrieving, from the database, specific optical data of individual color components used in the color formulation of the sample paint coating,
receiving, via the at least one interface, a measured color of the sample paint coating applied on a substrate using a sample paint application process,
receiving application adaption parameters for the sample paint application process,
predicting the color of the sample paint coating valid for use with the sample paint application process as specific paint application process, using the color predicting model and the application adaption module, wherein the data of the color formulation of the sample paint coating, the retrieved specific optical data of the individual color components used in the color formulation of the sample paint coating and the application adaption parameters for the sample paint coating are used as input parameters,
calculating an offset of the sample paint coating as difference between the measured color and the predicted color of the sample paint coating, and
introducing the offset into a calculation of the target color formulation, using the paint adjustment algorithm.

7. The method according to claim 1 to determine a target color formulation for a target paint coating which matches a given target color when being applied on a substrate using as specific application process a target paint application process, the method further comprising:

receiving, via at least one interface, data of a color formulation of a sample paint coating as a first solution for the target color to be matched, retrieving, from the database, specific optical data of individual color components used in the color formulation of the sample paint coating, receiving, via the at least one interface, a measured color of the sample paint coating applied on a substrate using a sample paint application process, receiving, via the at least one interface, application adaption parameters for the sample paint coating, predicting the color of the sample paint coating valid for use with the sample paint application process as specific paint application process, using the color predicting model and the application adaption module, wherein the data of the color formulation of the sample paint coating, the retrieved specific optical data of the individual color components used in the color formulation of the sample paint coating and the application adaption parameters for the sample paint coating are used as input parameters, calculating an offset of the sample paint coating as difference between the measured color and the predicted color of the sample paint coating, and introducing the offset into a calculation of the target color formulation, using the paint adjustment algorithm, receiving, via the at least one interface, application adaption parameters for the target application process, and calculating, using the target color, the calculated offset and the received application adaption parameters as input parameters for the paint adjustment algorithm, a color formulation with optimized concentrations of individual color components as target color formulation for the target paint coating when the target paint coating is applied on a substrate using the target paint application process.

8. A system, comprising at least:

a database which comprises individual color components and specific optical data associated with the respective individual color components, the specific optical data of the individual color components being determined on the basis of known reference paint coatings with known reference color formulations and known measured reference colors, the reference paint coatings being applied on a substrate using a reference paint application process, respectively, and at least one computer processor, which is in communicative connection with the database, and programmed to execute the method according to claim 1.

9. A non-transitory computer readable medium with a computer program with program codes that are configured and programmed, when the computer program is loaded and executed by at least one computer processor which is in communicative connection with a database which comprises individual color components and specific optical data associated with the respective individual color components, the specific optical data of the individual color components being determined on the basis of known reference paint coatings with known reference color formulations and known measured reference colors, the reference paint coatings being applied on a substrate using a reference paint application process, respectively, to execute the method according to claim 1.

10. The system according to claim 8, wherein the individual color components comprise pigments and/or pigment classes.

11. The non-transitory computer readable medium according to claim 9, wherein the individual color components comprise pigments and/or pigment classes.

* * * * *